UNITED STATES PATENT OFFICE.

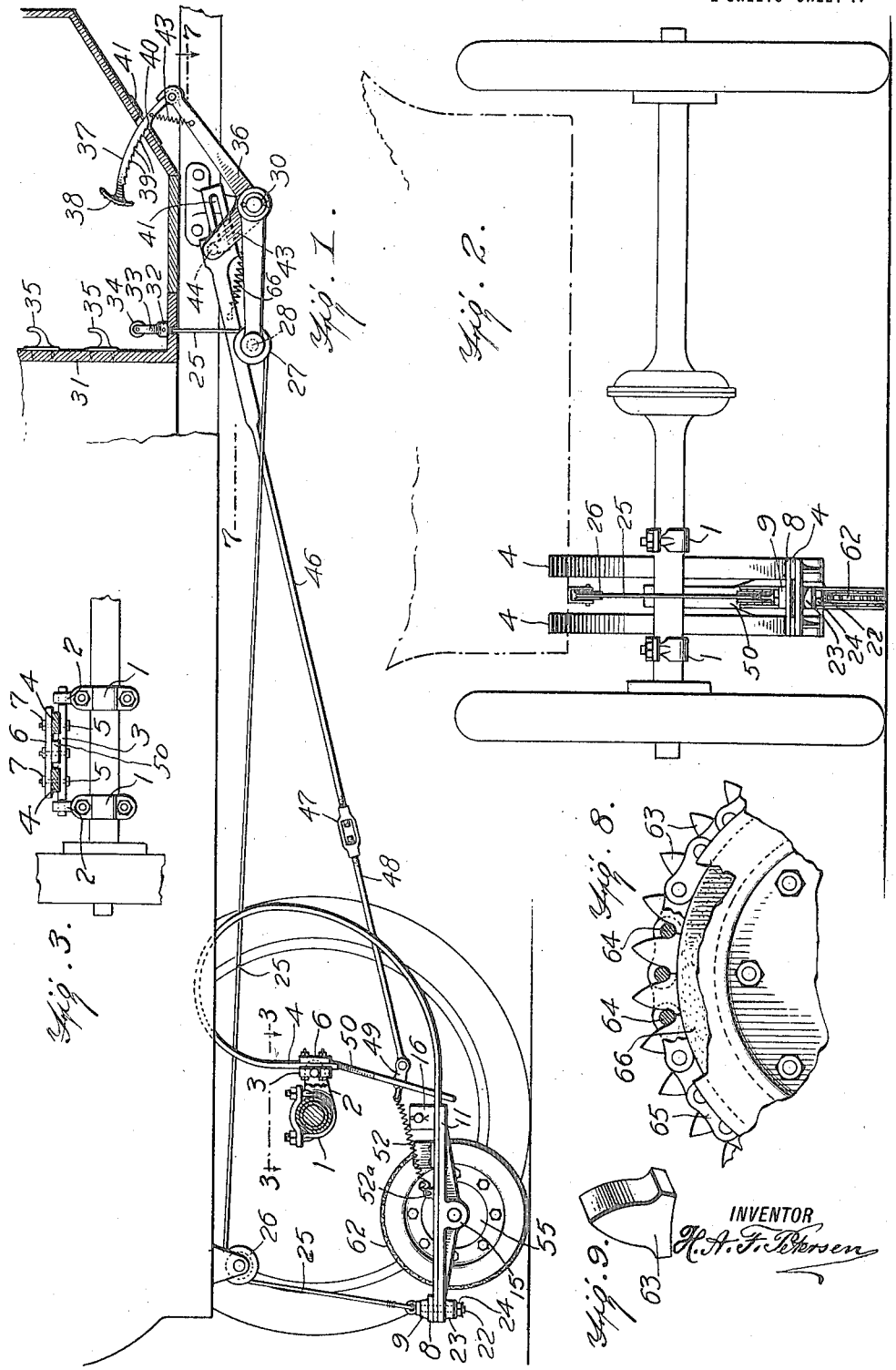

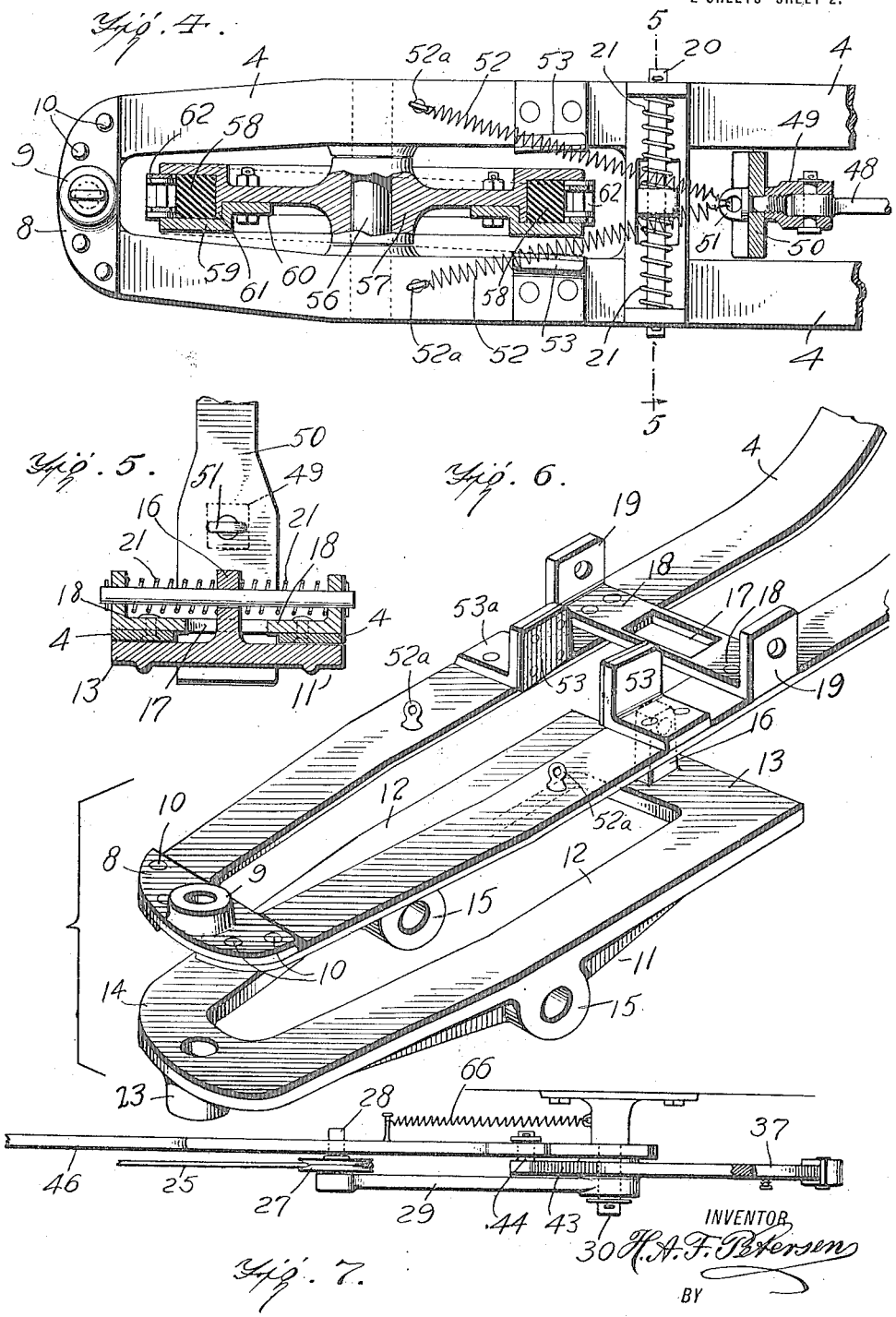

HERLUF A. F. PETERSEN, OF WASHINGTON, DISTRICT OF COLUMBIA.

ANTISKIDDING DEVICE FOR AUTOMOBILES.

1,206,242.  Specification of Letters Patent.  Patented Nov. 28, 1916.

Application filed November 23, 1915. Serial No. 62,940.

*To all whom it may concern:*

Be it known that I, HERLUF A. F. PETERSEN, residing in the city of Washington, in the District of Columbia, have invented certain new and useful Improvements in Antiskidding Devices for Automobiles, of which the following is a specification.

This invention is an improvement in antiskidding devices, especially designed for use in connection with motor vehicles, whereby skidding is effectually eliminated whether it be on paved streets or roadways of usual construction and the invention consists in certain novel constructions and combinations of parts as will be hereinafter described and claimed.

Figure 1 is a side elevation of my improved skidding device shown applied to a motor vehicle. Fig. 2 is an end view thereof. Fig. 3 is a cross section on the line 3—3 of Fig. 1. Fig. 4 is a plan view of the wheel-carrying truck partly broken away and sectioned. Fig. 5 is a transverse section on the line 5—5 of Fig. 4. Fig. 6 is a detail perspective view illustrating the truck and the spring terminals adapted to be connected thereto. Fig. 7 is a horizontal sectional view taken on the line 7—7 of Fig. 1. Fig. 8 is a side view of a portion of the ground wheel partly broken away illustrating a modified form. Fig. 9 is a perspective view illustrating one of the teeth shown in Fig. 8.

In carrying out my invention I employ U shaped clips 1, bolted to the rear axle of an automobile, said clips being spaced apart and preferably located adjacent to one of the rear drive wheels as plainly indicated in Fig. 2; each clip is provided with a forwardly projecting lug 2, provided with suitable openings or sockets in which are pivotally mounted the reduced and circular ends of a plate or bar 3; to this plate are secured the lower ends of two curved springs 4, by means of bolts 5, passed through the bar 3, the springs 4, and a face clamp plate 6, said plate 6 being securely held in place by the nuts 7 on said bolts 5. The springs 4 are given the desired tension and resiliency by extending them upwardly, then forwardly, then downwardly a suitable distance and thence curving and extending horizontally and rearwardly, their rear ends converging and being connected by a cross bar 8, having an integral vertical lug 9, having a central bore, said bar 8 being secured to the converged ends by rivets 10. The springs 4, with the rear ends so fashioned and connected, are superposed on the upper face of a truck 11, comprising the side bars 12, and front cross bar 13, and the rear cross bar 14; the side bars are each provided with the shaft hangers 15, the purpose of which will presently appear, while the front cross-bar 13 is provided with a perforated integral vertical lug 16, which extends upwardly through an elongated slot 17, in a cross plate 18, riveted to the upper face of the springs 4, to hold them securely in their spaced relation. The outer ends of said cross plate 18, are bent upwardly at a right angle to form perforated brackets 19, in which is slidably mounted a horizontal pin 20, which passes through the opening in the lug 16, which as stated, projects upwardly through the slot 17, and surrounding the said pin 20, on each side of the lug 16, and between the brackets 19, and said lug 16, are the coilsprings 21, which serve to maintain the lug 16, normally in the center of the slot 17, the rear end of the truck 11 being pivotally swung below the rear cross connecting bar 8, by means of an eye bolt 22, passing through the perforated lug 9, and a similar perforated lug 23, integral with the rear cross bar of the truck and extending downwardly therefrom; this eye bolt is held in position by a nut 24, screwed on its lower threaded end.

To the eye of the bolt 22, is secured one end of a cable 25, which extending upwardly passes over a pulley 26, suspended beneath the car-body, and then passes forwardly toward the front of the body where it passes around another pulley 27, mounted on a horizontal shaft 28, projecting laterally from the rear end of an arm 29, mounted on a horizontal pivot post 30, secured to the under part of the car-body; after passing around pulley 27, the cable 25 passes upwardly through an opening in the floor of the body near the support 31, of the front seat of the car and has secured to its end a metal plate 32, having a pair of vertically spaced apart ears 33, between which is mounted a roller 34, which is designed to be passed over and rest on bent hooks 35, projecting from the seat support 31. Pivotally mounted on the post 30 is also a bell crank lever 36, the forward end of which is jointed to a curved footrack 37, having the pedal 38, and provided on its under face with the teeth 39, which project rearwardly and are adapted to lockingly engage one wall 40 of the slot of a plate 41, secured to the front dash of the car; a small coiled spring 43, has one end connected to the arm 36, of the bell crank and the opposite end to the rack bar 37, and tends to normally hold said rack-bar to the plate edge 40. The shorter arm 43, of the bell crank lever has at its free end a laterally projecting pin 44, which engages an angular slot 45, in the forward end of an obliquely disposed rod 46, coupled by a turnbuckle 47, to a shorter rod 48, the rear end of which is pivotally secured to a bracket 49, projecting forwardly from a downwardly projecting bar 50, secured at its upper end between the rocker-bar 3, and the clamp plate 6, and projecting at its lower end between the spaced apart springs 4, slightly in advance of the lug 16, projecting upwardly from the truck; a removable eye 51, projects from the rear face of the bar 50, and has attached to it the front ends of the coiled springs 52, which extend divergently to the rear and are fastened at their rear ends to eyes 52ª, projecting from the springs 4. To the rear of the slotted cross-bar 13, each spring has secured to its upper face the vertical shoes 53, said shoes being substantially flush with the inner edges of the springs and provided with friction faces; these shoes preferably have an angularly bent base 53ª, by which they are secured to the springs 4.

Rotatably mounted in the hangers 15, is a wheel 55, by an axle 56, to which said wheel is rigidly secured; said wheel comprises a hub member 57, and an integral web, which has an angular enlargement at its periphery in which is held a ring 58, of rubber or other suitable elastic material, said ring being held in place by an annular plate 59, having a flange 60, bolted to the web of the wheel; the web also has an annular flange 61, which projects into the annular plate 59, and forms the support for the rubber ring or cushion 58; the diameter of the ring 58 is not as great as that of the wheel so that a space is left between the circumference of the ring and the outer edge of the web and the annular plate and within this space is placed the tire 62, of the wheel which as shown in Figs. 1, 2 and 4 consists of an endless sprocket chain such as is used for propelling bicycles and the like; said chain projecting beyond the body of the wheel; this form of tire is preferably used for travel on concrete, asphalt and other extremely hard pavements or roads which are liable to become slippery from mud or moisture, but on soft or dirt roads it may be found desirable to use a tire which will bite into and grip the roadway; for the purpose I have devised a modified form of tire as shown in Figs. 8 and 9, which comprises in addition to the sprocket chain beforementioned, the spikes or spuds 63, interposed from the inside between the cross-pins 64, which connect the side plates 65, of the sprocket chain the inner enlarged ends of the spuds resting on the annular cushion 66, whereby they may have radial movement, so that the wheel virtually becomes a spiked wheel.

The tire, whether of the plain sprocket chain type, or the spiked type, it will be seen, has a certain amount of flexibility, so that it can accommodate itself to the resiliency of the cushion rings 58 or 66, and thus add to its holding effect.

With the parts in the position shown in Fig. 1, which is the preferable one, as the danger of skidding is almost ever present in making sharp and sudden turns, it will be seen that the wheel is held yieldingly against the roadway by the springs 4, and can readily give to any obstructions it may encounter. This being so, it is thought that the operation will be readily understood, but in the interest of clearness the operation will be given in detail.

When a car starts to skid the tendency is to swing laterally to one side or the other of the straight line of travel and if not checked is apt to culminate in disastrous results and even in the overturning of the car. Now, when this skidding action commences, with my device in use, the wheel 55, being carried by the truck, has a yielding bearing on the roadway due to the springs 4, forcing it downwardly and forwardly; as the truck is pivotally connected only at its rear to the rear cross-bar 8, connecting the springs, this lateral swing of the car will cause the wheel to slew laterally in a direction opposite the skidding direction by virtue of its tire being in contact with the roadway, and hence will exert force diametrically in opposition to the skidding movement and cause the drive wheels and the car to resume its normal and direct line of travel; if the slewing action is great enough the sides of the wheel will be swung against the friction faced shoes 53, and the wheel's rotation impeded or stopped entirely and thus become a rigid stop against lateral movement of the car. As soon as pressure against the wheel is removed the springs 21, on each side of the lug 16, at the forward end of the truck 11, will cause the truck to resume its normal position and the wheel 55, will then rotate in a plane coincident with the direct and correct straight line of travel. To add to the traction of the wheel resort may be had to the foot lever 37, connected to the bell-crank lever 36; to do this the foot of the operator is forced against the pedal 38, which will cause the bell-crank to rock on post 30, and the pin 44 being in the upper end of the angular slot will pull the rods 46 and 48 forwardly and through bar 50, cause the rocker bar 3 to swing in the brackets and hence through the springs 4, rigidly secured to said rocker bar, to pull the truck and wheel carried thereby, forwardly and downwardly, and cause the wheel to bear with more pressure on the roadway, and the chain tire to be somewhat flattened so that it bears with much greater surface than is possible at a single point of tangency. To release this extra pressure the foot lever is allowed to move upwardly and rearwardly which will cause the short lever of the bell crank to swing downwardly and force the connecting rod 46 rearwardly and permit said rod 46 to resume its normal position.

If it is desired to hold the truck and wheel so that they will not operate at all, or when the car is at rest and in the garage, the wheel can be lifted entirely free of the ground by pulling upwardly on the front end of the cable and placing the roller 34 over one of the hooks 35, the rod 46 being lifted by the pin 28, on arm 29, and pin 44 is disengaged from the angled portion of the slot against tension of the spring 66.

From the above it will be seen that I provide simple, efficient and positive means for preventing skidding of an automobile, and while I have disclosed a desirable form of device it is obvious that I may employ other instrumentalities that fall within the scope of my invention, thus other means than the foot actuated means for varying the pressure may be used as for instance this might be done by suitably coupling up the parts with the motor whereby the motor imparts the necessary movements to actuate rod 46.

While I have shown in my traction device a single resiliently tired wheel it is obvious that I may use a series of such wheels arranged side by side and parallel with each other, and supported by a plurality of springs similar to springs 4.

I claim

1. The combination with an automobile of an antiskidding device comprising a rocker bar, an auxiliary traction device mounted to swing laterally with respect to the true straight line of travel and yieldable means intermediate the said rocker bar and traction device and operably connected therewith.

2. The combination with an automobile of an antiskidding device comprising a rocker bar, an auxiliary traction device mounted to swing laterally with respect to the true straight line of travel and yieldable means intermediate said rocker bar and traction device, said yieldable means being rigidly connected to said rocker bar.

3. The combination with a motor vehicle and its driving wheels, of an antiskidding device yieldingly suspended from the vehicle, comprising an auxiliary traction device mounted to swing laterally with respect to the true line of travel, and means for causing such lateral swing in a direction opposite to the skidding movement.

4. The combination with an automobile and its driving axle, of a truck yieldingly suspended from said axle, a single wheel rotatably mounted in said truck and adapted to bear downwardly and forwardly on the road bed, said truck pivotally connected at one end to the yielding suspension means, to permit angular lateral swing of the truck, and means for varying the pressure of the suspension means on the said truck.

5. The combination with a motor vehicle of an antiskidding device comprising an auxiliary rotatable traction device and resilient means carrying said auxiliary traction device, and supported from the vehicle, a rocker bar rigidly connected at one end to one end of said resilient means and manually operated means operably connected to the opposite end of said rocker bar for varying the pressure of said resilient means on said traction device.

6. The combination with an automobile, of an anti-skidding device, comprising an auxiliary rotatable flexible tired wheel, means for yieldingly suspending said wheel, means for permitting lateral swing of said wheel, and lateral brake shoes for contacting the sides of said wheel and retarding its rotation.

7. The combination with an automobile, of anti-skidding device comprising a bent spring member, a rocker bar to which one extremity of the spring member is secured, a truck mounted to swing laterally at one end and pivotally connected to the other extremity of said spring member, an auxiliary wheel rotatably mounted in said truck, means for limiting the lateral swing of said truck, and means for varying the pressure of the spring member on said truck.

8. The combination with an automobile, of an anti-skidding device, comprising a bent spring member, a rocker bar to which one extremity of said spring member is secured, a truck mounted to swing laterally at one end and pivotally connected to the other extremity of the said spring member, an auxiliary flexibly tired wheel rotatably mounted in said truck, means for limiting the lateral swing of said truck, a rod operably connected to said spring member for causing movement of the rocker bar, a bell-crank lever movably connected to said rod, and a push rod connected to the bell-crank lever to vary the pressure of the spring member on the truck through the connecting rod.

HERLUF A. F. PETERSEN.

Witnesses:
LOUIS H. SCHMIDT,
WALTER G. TROULAND.

Copies of this patent may be obtained for five cents each, by addressing the "Commissioner of Patents, Washington, D. C."